W. E. HOSCH, DEC'D.
A. M. HOSCH, ADMINISTRATRIX.
COUNTER ATTACHMENT.
APPLICATION FILED MAR. 12, 1917.
1,356,625.
Patented Oct. 26, 1920.
2 SHEETS—SHEET 1.
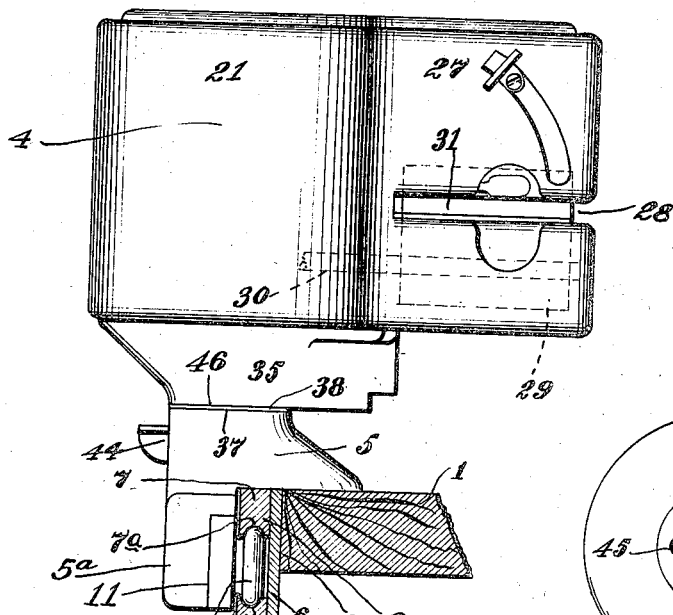
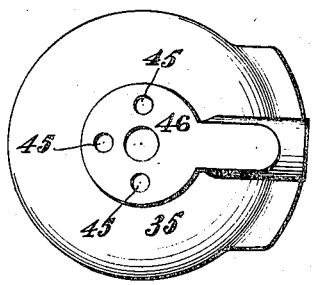
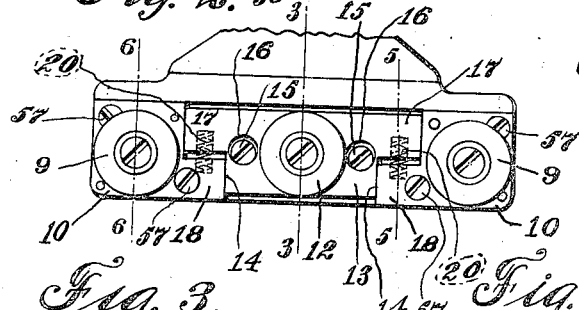
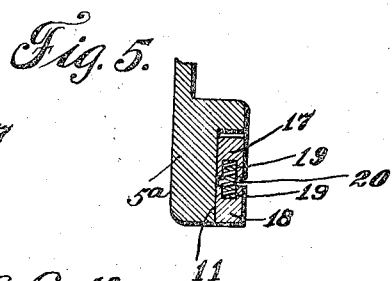
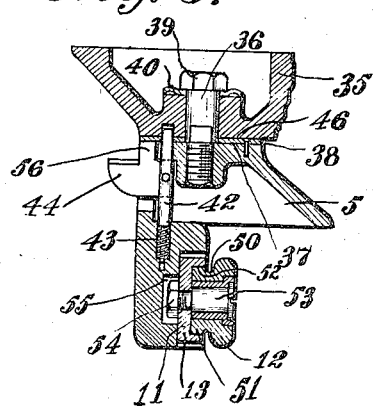
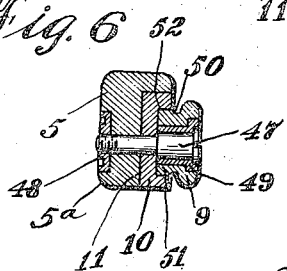
Inventor
Walter E. Hosch
By
Atty.

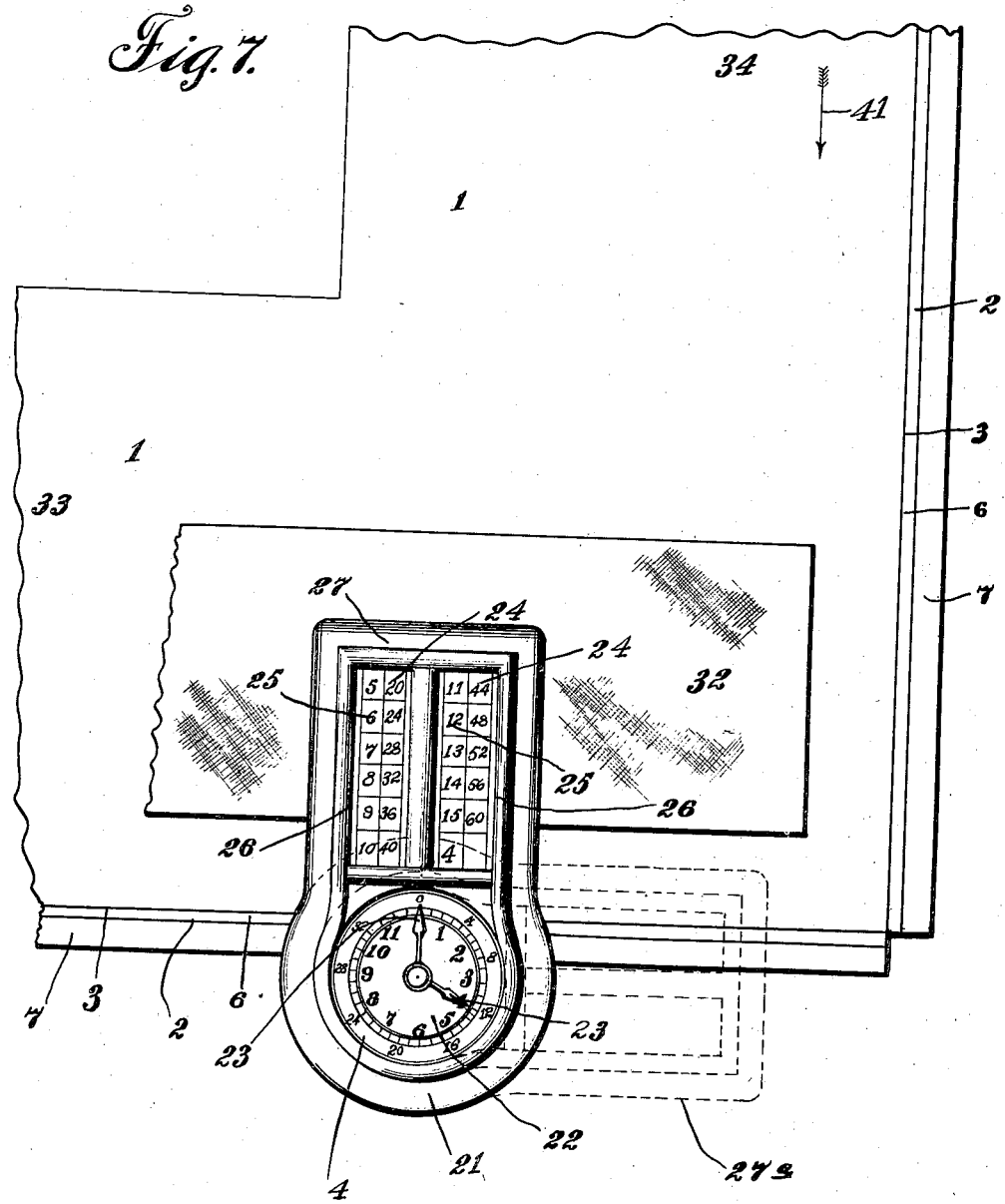

UNITED STATES PATENT OFFICE.

WALTER E. HOSCH, OF ST. LOUIS, MISSOURI; ANNIE MAE HOSCH, ADMINISTRATRIX OF SAID WALTER E. HOSCH, DECEASED, ASSIGNOR TO THE MEASUREGRAPH COMPANY, OF ST. LOUIS, MISSOURI, A CORPORATION.

COUNTER ATTACHMENT.

1,356,625.  Specification of Letters Patent.  Patented Oct. 26, 1920.

Application filed March 12, 1917. Serial No. 154,373.

*To all whom it may concern:*

Be it known that I, WALTER E. HOSCH, a citizen of the United States, residing in the city of St. Louis and State of Missouri, have invented new and useful Improvements in Counter Attachments, of which the following is a specification.

This invention relates to apparatus which is intended to be used as an attachment for a counter, across which goods are to be sold. In the present instance the attachment or apparatus includes a measuring device, the purpose of which is to measure lengths of cloth or ribbon or similar piece goods before being cut off from the roll or bolt. In the measuring operation the piece goods are pulled past or through the device, and some tension is necessarily developed in the piece goods or cloth being measured, due to the fact that it must advance the indicating mechanism of the measuring device.

The general object of the invention is to provide apparatus of this kind which will rigidly support the measuring device and enable it to be moved to any point on the counter where it may be desired to use it. To this end the invention embodies a construction which operates to hold the measuring device substantially rigidly on the counter, that is to say, sufficiently rigid to enable its measuring mechanism to be advanced by the piece goods passing through the machine; but so that the tension of the piece goods in passing through the machine will not operate to move the measuring device bodily along the counter. But if sufficient force is exerted upon the device it can be moved bodily along the counter to any other point desired. In measuring the piece of goods it must be passed in a certain direction through the machine and therefore, in order to adapt the device to special requirements, provision is made for shifting the axis of the machine to regulate it with respect to the longitudinal axis of the counter. In the present instance the measuring device embodies means such as a measuring roller or driving roller across which the cloth or ribbon passes, and the invention contemplates a construction which will enable the housing of the measuring device to shift to alter the position of the axis of this roller. This will control its relation with respect to the longitudinal or transverse axis of the counter. In other words, the invention contemplates an organization of the parts of such an apparatus as will enable the measuring device to be normally held substantially fixed at any point on the counter though it can be moved when desired to any other point; and also so constructed that the relation of the axis of the measuring device may be changed at will with respect to the axis of the counter.

Further objects of the invention will appear hereinafter.

In the drawings which illustrate the preferred embodiment of my invention—

Figure 1 is a side elevation of a measuring device and illustrating a portion of its guide track and the counter in cross section.

Fig. 2 is an elevation of the inner side of the lower portion of the base of the measuring device represented as removed from its guide means, the upper portion of the base being broken away.

Fig. 3 is a vertical section taken on the line 3—3 of Fig. 2 and illustrating details of the construction.

Fig. 4 is a bottom plan of the foot or lower end of the measuring device.

Fig. 5 is a vertical section through the base taken on the line 5—5 of Fig. 2.

Fig. 6 is a vertical section through the base taken on the line 6—6 of Fig. 2.

Fig. 7 is a plan illustrating the manner in which the device is used on the counter and also illustrating the manner in which the axis of the measuring device may be adjusted with respect to the counter.

In applying my attachment to a counter such as the counter 1 (see Fig. 1), I provide the counter with guiding means and I mount the measuring device so that it is held by the guiding means against lateral movement on the counter, but in such a way that it can be moved at will from one point to another along the counter. At the same time, the guiding means maintains the measuring device in a fixed angular relation to it. I provide means which will operate to prevent the measuring device from moving too freely along the counter. In order to accomplish this result, the guiding means is in the form of a guide track 2 which extends longitudinally of the counter, and is attached to the inner edge 3 of the counter adjacent to the salesman's position. The measuring device 4 is preferably supported on the bracket or base 5 which is movable along the track. To prevent the measuring device from moving too freely along the counter, I prefer to provide means for offering a considerable resistance to the movement along the track. In doing this I accomplish a double purpose because the effect is to take up any lost motion or play at the track. For this purpose I provide a back plate 6, (see Fig. 1), which extends longitudinally of the counter, and on the outer face of this back plate I rigidly attach an upper rail 7 and a lower rail 8. These rails form a track for guiding the measuring device along the counter, and for keeping it from moving laterally on the counter.

The lower portion of the bracket or base 5 is in the form of an elongated shoe 5ª extending longitudinally with the counter and provided with rail-engaging members with which I associate means which, in operation presses a portion of these rail-engaging members against one rail and another portion of the rail-engaging members against the opposite rail. In the present instance, I provide two relatively fixed rail-engaging members in the form of rollers 9, each of which is attached to a plate 10 secured on the vertical face 11 formed on the lower portion of the bracket 5.

In an intermediate position between these two rollers 9, I mount a rail engaging member in the form of another roller 12. This roller 12 is movable laterally with respect to the line joining the axes of the rollers 9, and I provide means tending to force the roller 12 laterally. For this purpose the roller 12 is mounted upon a plate or shoe 13 which is guided on vertical guide edges 14 which constitute the adjacent edges of the plates 10. Furthermore, this shoe or plate 13 is held against the vertical face 11 by means of suitable screws 15 which pass through enlarged openings 16 in the plate; these openings enable the plate 13 to move laterally in the manner suggested.

I provide resilient means tending to move the shoe laterally. For this purpose the ends of the shoe 13 are formed with extensions 17 which project over similar extensions 18 formed on the plates 10, and the adjacent horizontal edges of these projections 17 and 18 are drilled so as to form oppositely disposed spring pockets 19. In these pockets 19 are provided helical springs 20, the operation of which is to move a portion of the three rollers in one direction laterally and the other portion of the rollers in the opposite direction laterally. That is to say, referring to Fig. 2, in operation the springs would tend to move the rollers 9 downwardly and the roller 12 upwardly.

The measuring device 4 comprises a substantially cylindrical housing 21 in which there is carried measuring mechanism and indicating mechanism, including a measuring dial 22 with which hands 23 coöperate. This measuring mechanism, if desired, may include webs 24 carrying numbers coöperating with scales 25 visible in openings 26 formed in the upper side of a lateral extension 27 projecting horizontally from the housing 21. This projecting portion or housing 27 normally projects over the counter at right angles to the guide track 2 and is provided with a receiving throat or gap 28 in which there is located any suitable means for actuating the hands 23 and the webs 24. It is not considered necessary for the purposes of this application to illustrate this mechanism in detail as the complete mechanism for this purpose is fully illustrated in my co-pending application Sr. No. 17154. It is sufficient to say that such mechanism includes any suitable means such as a measuring roller or driving roller 29, the shaft 30 of which extends into the cylindrical housing 21 where it drives suitable mechanism to actuate the hands and the web. A presser roller 31 is provided for pressing the web of cloth or other goods against the driving roller 29 when the measurement of the goods is being taken.

Referring again to Figs. 1 and 2, I prefer to form the adjacent edges of the rails 7 and 8 each with a longitudinal groove or channel 7ª or 8ª which fits closely to the periphery of the rollers. If desired the rollers may have rounded peripheries and the grooves are then made semi-circular in cross section so as to fit the rollers. The springs 20 exert a very considerable force and normally tend to hold the roller 12 at a slightly elevated point out of line with the two rollers 9. In attaching the device to the track it is therefore necessary to exert considerable force on plate 13 to depress the plate sufficiently to bring the roller 12 in line with the rollers 9; this having been done, the rollers are shoved into the open end of the track so that they will lie between the rails 7 and 8. The springs 20 are then under considerable restraint and press the roller 12 against the upper rail 7 with considerable force and in a like manner they press the rollers 9 down against the rail 8. In this way the lower portion of the base is made to fit tightly in the track and all lost motion is taken up. At the same time the force of the springs is sufficient to hold the measuring device on the track with sufficient rigidity to enable a piece of goods, such as the cloth 32, to be drawn through the throat 28 longitudinally of the counter. (See Fig. 7.)

In Fig. 7 the measuring device is illustrated as located near a corner on the counter, and this counter may have an extension 33 extending toward the left and another extension 34 extending at right angles thereto. If desired, such a counter can be provided with one of my tracks 2 on the extension 34. With such an arrangement one of my measuring devices can be used on either one of the extensions 33 or 34 as may be desired.

In order to enable the device to adapt itself to special requirements and also to enable the housing extension 27 to be moved around out of the way, I provide means for supporting the measuring device 4 movably on the bracket or base 5 and this construction enables the measuring device to be held in a plurality of different positions. In order to do this, I form a foot 35 on the lower portion of the measuring device 4 and I attach this foot by a central pivot screw or bolt 36 to a horizontal upper face or seat 37 on the upper side of the base 5. This bolt or pin 36 operates as a swiveling point for the housing of the measuring device. In order to keep this swivel point tight I prefer to provide a washer 38 between the adjacent faces of the base and the foot 35. (See Fig. 3.) This washer is formed of some compressible, relatively soft material so that it acts as a cushion, and in addition to this, under the head 39 of the bolt, I provide a spring washer 40 which tends to hold the foot 35 of the housing securely and resiliently in place.

Any suitable means may be provided for holding the housing of the measuring device in any adjusted position; for example in Fig. 7 I have shown dotted lines 27ª which indicate an adjusted position for the device in which the housing 27 may extend at right angles to the position in which it is shown in full lines. In this position the projecting part of the housing clears the counter more effectually and it may also operate to place the receiving throat or gap 28 in position to enable the device to measure cloth drawn longitudinally in the direction of the arrow 41 on the counter extension 34. For ordinary purposes I provide means for locking the housing of the measuring device in three different positions, each position being at right angles to one of the other positions. For this purpose I provide a locking bolt 42 which is suitably guided on the base 5 so as to move in a vertical direction, said bolt being normally pressed upwardly by a spring 43 by which it tends to hold its upper end above the upper face of the washer 38. This bolt is provided with a laterally projecting finger plate 44. When the locking bolt 42 is in its elevated position it may engage any one of three recesses 45 drilled in the lower face 46 of the foot 35.

Evidently by pressing downwardly on the finger plate, the end of the bolt 42 can be disengaged from the foot 35 so as to permit the foot to be swung around into a new position, with any other one of the recesses 45 alining with the bolt. The release of the bolt will, of course, then lock the housing in this new position.

Figs. 3 and 6 show details of the construction for mounting the rollers 9 and 12. In Fig. 6 the roller 9 is illustrated as secured in place by a pivot screw 47, the inner end of which passes through its corresponding plate 10 and is held at the back of the lower portion of the base by means of a spanner nut 48. The pivot screw 47 may be provided with a suitable bushing 49 on which the roller 9 is mounted. In order to prevent any threads or any article of this nature from becoming entangled around the pin 47, I prefer to provide each roller with a reduced neck 50 near the outer face of the plate 10; and beyond this neck 50 the roller is formed with an enlarged neck or hub 51 which is recessed or counter sunk into the outer face of the plate. With this construction it is evident that if a thread becomes caught around the roller it will wind around the neck 50 and will, in this way, be prevented from passing into the counter bore 52 which receives the hub 51. This arrangement is desirable in order to provide for the contingency of wear taking place at the points 51 and 52 which might provide sufficient space to catch and entangle a thread.

A similar construction to this is provided in connection with the roller 12 (see Fig. 3) except that in this instance the pivot bolt 53 does not pass through the lower portion of the base 5 but its inner end is secured by a nut 54 received in an enlarged pocket 55 which permits of the necessary lateral movement of the plate 13 which has been described above.

In order to provide a stop for limiting the upward movement of the bolt 42, the finger piece 44 is provided with an upwardly disposed extension or finger 56, the upper end of which engages the under side of the washer 38.

The plates 10 may be secured in place by suitable machine screws 57.

It is understood that the embodiment of my invention described above is only one embodiment of my invention, and I do not wish to be limited in the practice of my invention nor in my claims to the particular embodiment set forth.

What I claim is:

1. In apparatus for measuring piece-goods, the combination of guiding means, a cloth measuring device mounted to move along said guiding means, said cloth measuring device having indicating mechanism therein actuated by a length of goods when drawn through the cloth measuring device in a direction extending longitudinally with said guiding means, and means coöperating with said measuring device for preventing the same from being moved along said guiding means by the tension of the goods when being measured.

2. In apparatus for measuring piece-goods, the combination of a counter having two extensions disposed substantially at right angles to each other, guiding means extending along one of the extensions, a bracket movable along the guiding means, a cloth measuring device mounted to swivel on said bracket and carrying indicating mechanism actuated by the length of goods when drawn through the cloth measuring device in a direction extending longitudinally with one of said extensions and parallel with said guiding means, and means for holding said measuring device in a second adjusted position on its swivel to enable it to measure goods when pulled along the other extension of the counter.

3. In a counter attachment, the combination of a guide track attached to and extending longitudinally of the counter, a bracket mounted to move along said track, a cloth measuring device mounted on said bracket and including a housing having a receiving throat through which the piece of goods may be drawn to measure it, and means for holding said housing on said bracket in a plurality of different positions to enable the relation of said receiving throat to be regulated with respect to the axis of the counter.

4. In apparatus for measuring piece-goods, the combination of guiding means constructed to extend along a counter, a bracket movable along the guiding means, a cloth measuring device mounted to swivel on said bracket, and having a housing with an extension normally projecting across the counter and substantially at right angles to the guiding means, and means for locking said housing so that said extension extends substantially parallel with the guiding means.

In testimony whereof I have hereunto set my hand.

WALTER E. HOSCH.